United States Patent
Hu et al.

(10) Patent No.: US 12,404,054 B2
(45) Date of Patent: Sep. 2, 2025

(54) METHOD AND APPARATUS FOR GENERATING STRATEGY OF OBJECT TRANSPORT-AND-PACK PROCESS, AND COMPUTER DEVICE

(71) Applicant: SHENZHEN UNIVERSITY, Guangdong (CN)

(72) Inventors: Ruizhen Hu, Shenzhen (CN); Hui Huang, Shenzhen (CN); Hao Zhang, Shenzhen (CN); Minglun Gong, Shenzhen (CN); Juzhan Xu, Shenzhen (CN); Bin Chen, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 498 days.

(21) Appl. No.: 17/947,933

(22) Filed: Sep. 19, 2022

(65) Prior Publication Data
US 2023/0011757 A1    Jan. 12, 2023

Related U.S. Application Data

(63) Continuation of application No. PCT/CN2020/090524, filed on May 15, 2020.

(30) Foreign Application Priority Data

May 6, 2020    (CN) .................. 202010371670.X

(51) Int. Cl.
*G06Q 10/0832*    (2023.01)
*B65B 1/30*    (2006.01)
*G06N 3/045*    (2023.01)

(52) U.S. Cl.
CPC ............. *B65B 1/30* (2013.01); *G06N 3/045* (2023.01); *G06Q 10/0832* (2013.01)

(58) Field of Classification Search
CPC .. B65G 57/00; G06Q 10/087; G06Q 10/0832; G06N 3/045
(Continued)

(56) References Cited

U.S. PATENT DOCUMENTS 8,489,229 B2 * 7/2013 Kuehnemann et al. .................... B65G 57/00 700/217
9,965,730 B2 * 5/2018 Hance et al. ........ G06Q 10/043

(Continued)

FOREIGN PATENT DOCUMENTS

| CN | 108009675 A | 5/2018 |
|---|---|---|
| CN | 108268878 A | 7/2018 |

(Continued)

OTHER PUBLICATIONS

Zhai Yu, et al., "A Heuristic Algorithm for Three-Dimensional Container Loading Problem with Non-identical Items", Journal of Shanghai Jiaotong University, vol. 41 No. 8, Aug. 2007.

(Continued)

*Primary Examiner* — Gene O Crawford
(74) *Attorney, Agent, or Firm* — GREENBLUM & BERNSTEIN, P.L.C.

(57) ABSTRACT

A method for generating a strategy of an object transport-and-pack process, and a computer device. The method includes: obtaining a priority diagram of a to-be-packed object set in an initial container; encoding the priority diagram; performing a convolution calculation by a neural network, and determining a current to-be-packed object; generating a packing sequence of to-be-packed objects in the to-be-packed object set; and determining a strategy of a packing process of the to-be-packed object set according to (Continued)

a packing target, the packing sequence of the to-be-packed objects, and a transport state of each to-be-packed object and a preset layout strategy.

20 Claims, 8 Drawing Sheets

(58) Field of Classification Search
USPC .......................................... 700/213, 216, 217
See application file for complete search history.

(56) References Cited

U.S. PATENT DOCUMENTS

| | | | | |
|---|---|---|---|---|
| 10,894,676 | B2* | 1/2021 | Turpin et al. ........... | B65G 57/03 |
| 2012/0283868 | A1* | 11/2012 | Rutt et al. ............ | G06Q 10/083 |
| | | | | 700/217 |
| 2018/0285715 | A1 | 10/2018 | Son et al. | |

FOREIGN PATENT DOCUMENTS

| | | |
|---|---|---|
| CN | 109345017 A | 2/2019 |
| CN | 109685278 A | 4/2019 |
| CN | 110210685 A | 9/2019 |
| CN | 110288287 A | 9/2019 |
| CN | 110555424 A | 12/2019 |
| CN | 110852324 A | 2/2020 |
| CN | 110929792 A | 3/2020 |
| CN | 111099363 A | 5/2020 |
| WO | 2019/152337 A1 | 8/2019 |

OTHER PUBLICATIONS

Kong, Liang, et al., "Research and design of three-dimensional container loading optimization system", Journal of Railway Freight Transport , vol. 11, Nov. 10, 2008.
Chinese Office Action issued in corresponding CN Application No. 202010371670.X, dated Sep. 30, 2022.
International Search Report dated Feb. 4, 2021 issued in corresponding parent Patent Application No. PCT/CN2020/090524 w/English Translation (6 pages).
PCT/ISA/220 Notification of Transmittal of the International Search Report and the Written Opinion of the International Searching Authority, or the Declaration dated Feb. 4, 2021 issued in corresponding parent Patent Application No. PCT/CN2020/090524 (1 page).
Written Opinion dated Feb. 4, 2021 issued in corresponding parent Patent Application No. PCT/CN2020/090524 w/English Translation (5 pages).

* cited by examiner

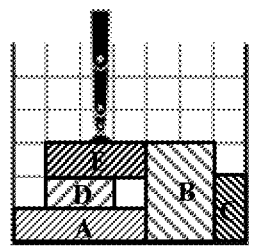 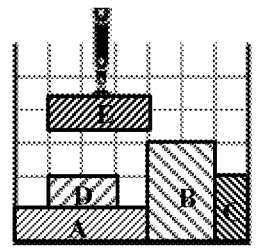
FIG. 2A　　　　　　　　　　FIG. 2B
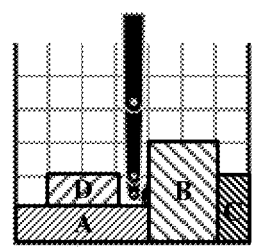 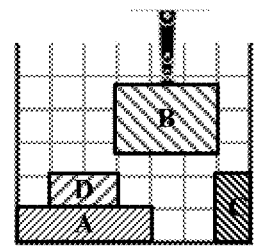
FIG. 2C　　　　　　　　　　FIG. 2D
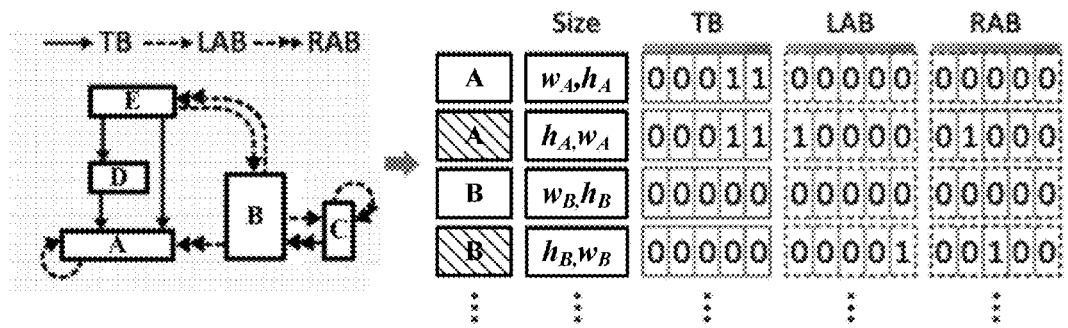
FIG. 3

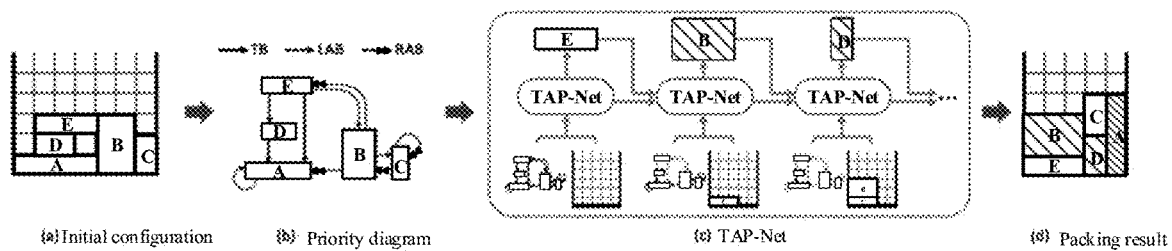
| FIG. 4A | FIG. 4B | FIG. 4C | FIG. 4D |
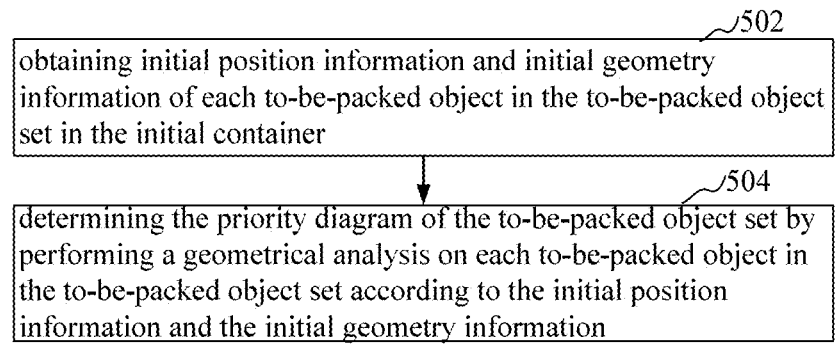
FIG. 5
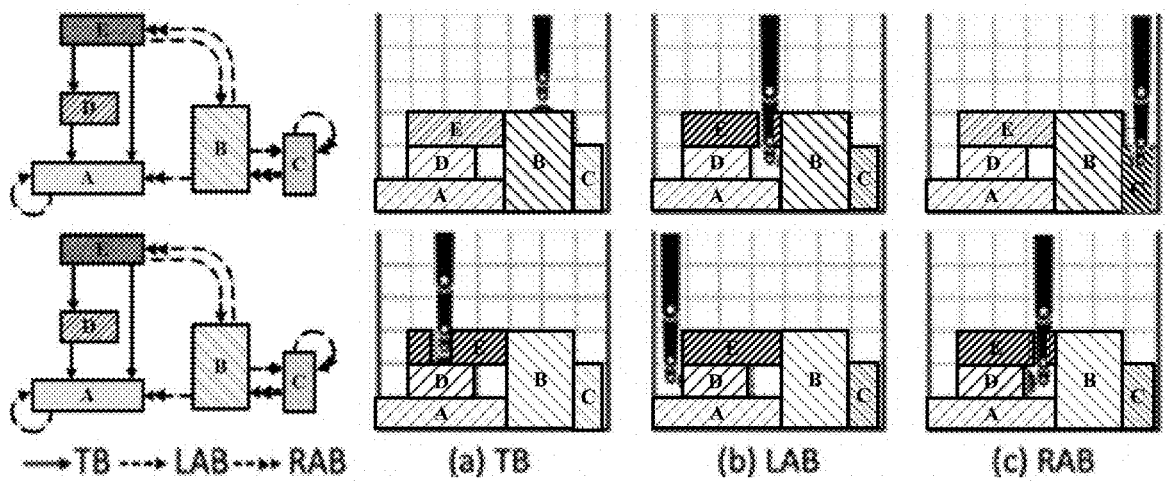
FIG. 6

METHOD AND APPARATUS FOR GENERATING STRATEGY OF OBJECT TRANSPORT-AND-PACK PROCESS, AND COMPUTER DEVICE

CROSS-REFERENCE TO RELATED APPLICATION

This application is a continuation of International Application No. PCT/CN2020/090524, filed on May 15, 2020, which claims priority to Chinese Patent Application No. 202010371670.X, filed on May 6, 2020 and entitled "Method and Apparatus for Generating Strategy of Object Transport-and-Pack Process, and Computer Device". The contents of the above identified applications are hereby incorporated herein in their entireties by reference.

TECHNICAL FIELD

This disclosure relates to the field of object packing technology, in particular to a method and an apparatus for generating a strategy of an object transport-and-pack process, a computer device, and a non-transitory storage medium.

BACKGROUND

A packing problem is a well-known discrete optimization problem and has a wide range of geometric applications in the field of computer graphics, such as texture diagram generation, artistic typography, 2D panel manufacturing, and 3D printing. However, in other real-world applications involving physical objects, such as packing and transporting by a robot, etc., there are often more constraints that are necessarily dealt with. An important change of the problem of physical packing is that at first, the object, such as accumulated stock in a warehouse, etc., has been already in a certain spatial configuration, and the removal of the object must follow some order, for example, before a second object pressing the top of a first object is transported and packed, the first object cannot be removed. Therefore, in a practical application of packing physical objects, the packing process is crucial to a final packing state of the objects.

However, in the matter of geometry packing, it is only needed to optimize the packing effect of virtual objects, and the optimization is used in scenes such as display, storage or manufacturing. In the matter of physical packing, the initial state has strict constraints on a packing sequence and orientations of the objects. In the existing packing technology, a packing is performed assuming that the to-be-packed object is free of any extra space constraint or dependence constraint, and the packing effect only displays a packing result, and during an actual packing, it takes some time to analyze how to pack the object according to the packing effect, thus resulting in a low packing efficiency for the object.

SUMMARY

In view of the technical problems, it is necessary to provide a method and an apparatus for generating a strategy of an object transport-and-pack process, a computer device, and a non-transitory storage medium that can improve the object transport-and-pack efficiency.

A method for generating a strategy of an object transport-and-pack process, includes: obtaining a priority diagram of a to-be-packed object set in an initial container, the priority diagram being configured to describe dependence constraints between to-be-packed objects in the to-be-packed object set; encoding the priority diagram to obtain encoded geometry information and encoded dependence information of each to-be-packed object in a preset state; performing, by a neural network (NN), a convolution calculation on the encoded geometry information and the encoded dependence information of each to-be-packed object in the to-be-packed object set in the preset state, and a current height graph of a target container, and determining a current to-be-packed object and a corresponding transport state thereof; generating a packing sequence of to-be-packed objects in the to-be-packed object set; and determining a strategy of a packing process of the to-be-packed object set according to a packing target, the packing sequence of the to-be-packed objects, and the transport state of each to-be-packed object and a preset layout strategy.

An apparatus for generating a strategy of an object transport-and-pack process, includes: an acquiring module, an encoding module, a convolution module, and a determining module.

The acquiring module is configured to obtain a priority diagram of a to-be-packed object set in an initial container, and the priority diagram is configured to describe dependence constraints between to-be-packed objects in the to-be-packed object set.

The encoding module is configured to encode the priority diagram to obtain encoded geometry information and encoded dependence information of each to-be-packed object in a preset state.

The convolution module is configured to perform a convolution calculation on the encoded geometry information and the encoded dependence information of each to-be-packed object in the to-be-packed object set in the preset state, and a current height graph of a target container by a neural network (NN), and to determine a current to-be-packed object and a corresponding transport state thereof, and to generate a packing sequence of to-be-packed objects in the to-be-packed object set.

A determining module is configured to determine a strategy of a packing process of the to-be-packed object set according to the packing target, the packing sequence of the to-be-packed objects, the transport state of each to-be-packed object, and the preset layout strategy.

A computer device, including a memory and a processor, is provided, and the memory stores computer programs. The processor, when executing the computer programs, performs the steps of the method for generating the strategy of the object transport-and-pack process above.

A non-transitory computer-readable storage medium, on which computer programs are stored, is provided. The computer programs, when being executed by a processor, cause the processor to perform the steps of the method for generating the strategy of the object transport-and-pack process above.

In the above method and the apparatus for generating the strategy of the object transport-and-pack process, the computer device, and the storage medium, by obtaining the priority diagram of the to-be-packed object set in the initial container, and by encoding the priority diagram through the NN, the encoded geometry information and the encoded dependence information of each to-be-packed object in the preset state are obtained. The convolution calculation is performed on the encoded geometry information and the encoded dependence information of each to-be-packed object in the to-be-packed object set, and the current height graph of the target container in sequence, and the packing sequence of to-be-packed objects in the to-be-packed object set is obtained. The strategy of the packing process of the to-be-packed object set is determined according to the packing target, the packing sequence of the to-be-packed objects, the transport state and the preset layout strategy of each to-be-packed object. The strategy of the packing process is obtained according to the packing sequence of the to-be-packed objects, and the transport state and the preset layout strategy of each to-be-packed object, therefore the packing sequence of the to-be-packed objects, the transport state during the packing process, and the layout position after transport are considered in the strategy of the packing process. The strategy of the packing process may guide packing operations, thereby solving the object transport-and-pack problem, and further improving the efficiency of the object transport-and-pack.

BRIEF DESCRIPTION OF THE DRAWINGS

FIGS. 2A-2D are schematic views illustrating a translational transport and a rotational transport for a to-be-packed object according to an embodiment.

FIG. 3 is a view illustrating encoding results of geometry information and dependence information of to-be-packed objects according to an embodiment.

FIGS. 4A-4D are schematic views illustrating a packing corresponding to the method for generating the strategy of the object transport-and-pack process according to an embodiment.

FIG. 5 is a schematic flowchart of establishing a priority diagram according to an embodiment.

FIG. 6 is a schematic view illustrating a process of establishing the priority diagram according to an embodiment.

DETAILED DESCRIPTION OF THE EMBODIMENTS

In order to make the objective, technical solutions and advantages of the present disclosure clearer and better understood, the present disclosure will be further described in detail with reference to the accompanying drawings and embodiments. It should be understood that the embodiments described hereinafter are only used to explain the present disclosure, but not intended to limit the present disclosure.

Figure 1:
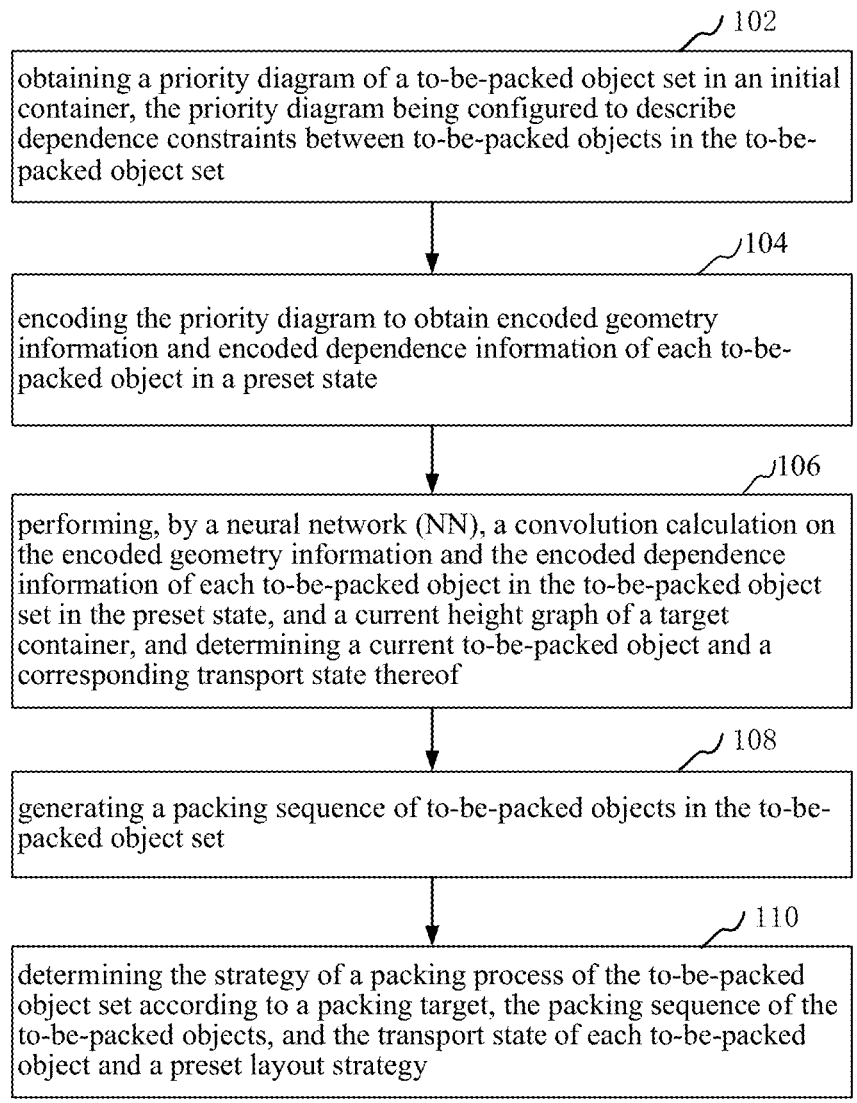
FIG. 1 is a schematic flowchart of a method for generating a strategy of an object transport-and-pack process according to an embodiment.

In an embodiment, as shown in FIG. 1, a method for generating a strategy of an object transport-and-pack process is provided. In this embodiment, taking the method applied to a terminal as an example, it may be understood that the method may also be applied to a server, or may also be applied to a system including a terminal and a server, and is realized through an interaction between the terminal and the server. In this embodiment, the method includes the following step 102 to step 110.

At step 102, a priority diagram of a to-be-packed object set in an initial container is obtained, and the priority diagram is configured to describe dependence constraints between to-be-packed objects in the to-be-packed object set.

The to-be-packed objects are two-dimensional objects or three-dimensional objects. This embodiment is illustrated taking the packing of the two-dimensional objects as an example. The dependence constraint may be a transport constraint between to-be-packed objects during a transport. The transport constraint may be a blocking constraint, and an accessibility constraint of the to-be-packed object, etc. For example, the initial container contains a first to-be-packed object and a second to-be-packed object. The first to-be-packed objects is stacked on the top of the second to-be-packed object, and the second to-be-packed object is blocked by the first to-be-packed object, so only after the first to-be-packed object is transported, can the second to-be-packed object be packed.

The priority diagram describes the dependence constraint between the to-be-packed objects by means of a graph. The priority diagram is determined by analyzing the initial position information and the initial geometry information of each to-be-packed object in the initial container. The initial position information refers to a relative coordinate position of each to-be-packed object in the initial container, and the initial geometry information refers to a width and a height of each to-be-packed object arranged in the initial container. The transport sequence of the to-be-packed objects in the initial container may be determined according to the priority diagram.

Specifically, the terminal receives the initial position information and the initial geometry information of each to-be-packed object in the to-be-packed object set in the initial container, analyzes the initial position information and the initial geometry information of each to-be-packed object, determines the dependence constraint between to-be-packed objects, and describes the dependence constraint between to-be-packed objects by means of a diagram to get the priority diagram of the to-be-packed object set in the initial container.

At step 104, the priority diagram is encoded to obtain encoded geometry information and encoded dependence information of each to-be-packed object in a preset state.

The preset state refers to a preset transport state of an object, and the preset transport state includes a translational transport and a rotational transport. FIG. 2A and FIG. 2B illustrate an example of the transport-and-pack in the case of the translational transport, and FIG. 2C and FIG. 2D illustrate an example of the transport-and-pack in the case of the rotational transport. FIG. 2A and FIG. 2C illustrate states of the objects in the initial container, and FIG. 2B and FIG. 2D illustrate states of the objects in the target container.

Specifically, the terminal sends the priority diagram of the to-be-packed object set to the neural network (NN). The NN may be, but is not limited to a transport-and-pack Net (TAP-Net). The TAP-Net includes an encoder and a decoder with attention mechanism. The encoder in the TAP-Net extracts each to-be-packed object in the to-be-packed object set from the priority diagram, encodes the initial geometry information and the initial dependence information of each to-be-packed object to obtain encoded geometry information and encoded dependence information. The encoded dependence information may be represented by "0" and "1", and "0" represents that there is no constraint, and "1" represents that there is a constraint. Optionally, the encoded geometry information and encoded dependence information may include geometry information and dependence information corresponding to the to-be-packed objects in a translational transport, and geometry information and dependence information corresponding to the to-be-packed objects in a rotational transport. As shown in FIG. 3, there are to-be-packed objects A, B, C, D, and E in the to-be-packed object set. The geometry information of the translational transport of the to-be-packed object A is $(w_A, h_A)$, where $w_A$ represents a width of the to-be-packed object A, $h_A$ represents a height of the to-be-packed object A. The top dependence information is represented as "00011", that is, when the to-be-packed object A is in a translational transport, the to-be-packed objects D, E are located on the top of the to-be-packed object A. The left dependence information is "00000", that is, there is no dependence constraint on the left when the to-be-packed object A is in the translational transport. The right dependence information is "00000", that is, there is no dependence constraint on the right when the to-be-packed object A is in the translation transport. The geometry information of the rotational transport of the to-be-packed object A is $(h_A, w_A)$, and the top dependence information is "00011", that is, when the to-be-packed object A is in the rotational transport, the to-be-packed objects D and E are located on the top of the to-be-packed object A. The left dependence information is "10000", that is, when the to-be-packed object A is in the rotational transport, the left thereof is next to a wall of the target container. The right dependence information is "01000", that is, when the to-be-packed object A is in the rotational transport, the to-be-packed object B is on the right of the to-be-packed object A.

At step 106, a convolution calculation is performed on the encoded geometry information and the encoded dependence information of each to-be-packed object in the to-be-packed object set in the preset state, and a current height graph of the target container by the NN, and a current to-be-packed object and a corresponding transport state thereof are determined.

At step 108, a packing sequence of the to-be-packed objects in the to-be-packed object set is generated.

The height graph is used to describe an actual packing state of the target container, and there is a mapping relationship between the height graph and the target container. The height graph is a multi-dimensional array where an index value of each element in the array locates a different grid, and a value of each element is the height of the corresponding grid.

Specifically, the NN includes an encoder and a decoder. The encoded geometry information and the encoded dependence information of each to-be-packed object in the to-be-packed object set in the preset state, and the current height graph of the target container are the inputs information of the NN. The convolution calculation is performed on the inputted information by the encoder and the decoder in the NN, and the current to-be-packed object and the corresponding transport state thereof are determined and outputted. Optionally, there are n to-be-packed objects in the to-be-packed object set, and the NN performs convolution calculations n times, and determines a current to-be-packed object and the corresponding transport state thereof n times. The NN generates the packing sequence of the objects in the to-be-packed object set according to the current to-be-packed objects and the corresponding transport states thereof which are determined n times.

At step 110, a strategy of a packing process of the to-be-packed object set is determined according to a packing target, the packing sequence of the objects, and the transport state of each to-be-packed object and a preset layout strategy.

The packing target is a standard to judge packing quality. The packing target includes at least one of a compactness target, a conical degree target, and a stability target. The compactness target is determined by means of a ratio of a total area of all to-be-packed objects to an area of a rectangle determined by the largest height and the width of the target container. The conical degree target is determined by means of a ratio of the total area of all to-be-packed objects to a projected area of all to-be-packed objects projected onto the bottom of the container. The stability target is determined by means of a ratio of the number of stable objects in the target container to the total number of the packed objects. The stability determination of each to-be-packed object in the packing process includes following steps. Firstly, through a geometrical analysis, all contact points between a lower surface of the to-be-packed object at a current position and the edges of the packed object are found out, and a center point of the lower surface of the to-be-packed object is found out. Then adjacent contact points are connected to form an outlined area. In the case of a two-dimensional object, the outlined area is a line segment, and in the case of a three-dimensional object, the outlined area is a polygon. Finally, it is determined whether the center point is in the outlined area. If the center point is in the outlined area, the to-be-packed object is stable, otherwise, the to-be-packed object is unstable.

The preset layout strategy is an object layout strategy which is set in advance. The preset layout strategy is a packing strategy based on the maximum remaining space, and includes a leftmost and highest packing strategy, and a multi-corner packing strategy, both of which are to find the maximum remaining space in the remaining space of the target container. The leftmost and highest packing strategy only tests a position of a lower left corner of each maximum remaining space, and then the strategy with the largest packing target value is selected. The multi-corner packing strategy tests each corner of the maximum remaining space, and then the strategy with the largest packing target value is selected.

Specifically, the packing sequence of the objects, and the packing target value of the transport state of each to-be-packed object, which corresponds to each preset layout strategy, are calculated, according to the packing sequence of the objects and the transport state of each to-be-packed object which are output by the NN, and the preset layout strategies and the packing target. The packing target value of the largest value is obtained from the calculated packing target values, and the preset layout strategy corresponding to the packing target value of the largest value is used as the strategy of the packing process of the to-be-packed object set.

In an embodiment, the strategy of the packing process of the to-be-packed object set is determined according to the packing sequence of the objects, the transport state of each packed object, and a preset layout strategy of maximizing accessible convex space. Optionally, before packing, all accessible convex space in the target container is determined. When being packed in the target container, based on the layout strategy of maximizing the accessible convex space, the current to-be-packed objects are arranged in the accessible convex space in the target container in sequence according to the corresponding transport states. The maximum accessible convex space area in the remaining space is calculated after the object is arranged. The layout strategy of the preset maximum accessible convex space, which corresponds to the largest accessible convex space area, is determined to be the strategy of the packing process of the to-be-packed object set. This method can improve the utilization ratio of the packing space of the target container.

An application scenario generated by the strategy of the object transport-and-pack process is shown in FIG. 4A to FIG. 4D.

The terminal obtains the priority diagram (FIG. 4B) of the to-be-packed object set (FIG. 4A) in the initial container. The priority diagram is configured to describe the dependence restraints between to-be-packed objects in the to-be-packed object set. The encoder in the TAP-Net encodes the priority diagram to obtain the geometry information and the dependence information of each to-be-packed object in the preset state. The geometry information and the dependence information of each to-be-packed object in the preset state, and the height graph of the target container are inputted into the TAP-Net (FIG. 4C), the encoder and the decoder with the attention mechanism in the TAP-Net perform the convolution calculation on the inputted information in sequence to determine the current to-be-packed object and the corresponding transport state thereof. The packing sequence of the objects in the to-be-packed object set is generated according to all determined current to-be-packed objects and the corresponding transport states thereof. The strategy of the packing process of the to-be-packed object set is determined according to the packing target, the packing sequence of the objects, the transport states and the preset layout strategies of the packed objects. The terminal communicates with a transporting equipment, and generates a corresponding control instruction according to the determined strategy of the packing process. The control instruction instructs the transporting equipment to pack the to-be-packed objects in the initial container into the target container in sequence according to the strategy of the packing process, to complete packing the objects. The packing effect is shown in FIG. 4D.

In the above method for generating the strategy of the object transport-and-pack process, the priority diagram of the to-be-packed object set in the initial container is obtained. The priority diagram is configured to describe the dependence constraints between the to-be-packed objects in the to-be-packed object set. The encoded geometry information and the encoded dependence information of each to-be-packed object in the preset state are obtained by encoding the priority diagram through the NN. The convolution calculation is performed on the encoded geometry information and the encoded dependence information of each to-be-packed object in the to-be-packed object set, and the current height graph of the target container in sequence, so that the current to-be-packed objects and the corresponding transport states thereof are determined to obtain the packing sequence of objects in the to-be-packed object set. The strategy of the packing process of the to-be-packed object set is determined according to the packing target, the packing sequence of the objects, the transport state and the preset layout strategy of each to-be-packed object. In this way, the strategy of the packing process is obtained according to the packing sequence of the objects, and the transport state and the preset layout strategy of each packed object, therefore the packing sequence of the objects, the transport state during the packing process, and the layout position after transport are considered in the strategy of the packing process. The strategy of the packing process may guide packing operations, thereby solving the object transport-and-pack problem, and further improving the efficiency of the object transport-and-pack.

In an embodiment, as shown in FIG. 5, a process for establishing a priority diagram is provided. In this embodiment, taking the process applied to the terminal as an example, the process includes the following step 502 to step 504.

At step 502, initial position information and initial geometry information of each to-be-packed object in the to-be-packed object set in the initial container are obtained.

The initial position information refers to a relative coordinate position of each to-be-packed object in the initial container, and the initial geometry information refers to a width and a height of each to-be-packed object arranged in the initial container.

Specifically, the terminal receives initial container information inputted through an interface, and obtains the initial position information and the initial geometry information of each to-be-packed object in the to-be-packed object set in the initial container according to the initial container information.

At step 504, the priority diagram of the to-be-packed object set is determined by performing a geometrical analysis on each to-be-packed object in the to-be-packed object set according to the initial position information and the initial geometry information.

In an embodiment, the determining the priority diagram of the to-be-packed object set by performing the geometrical analysis on each to-be-packed object in the to-be-packed object set according to the initial position information and the initial geometry information includes the following steps.

Space in each direction of each to-be-packed object in the to-be-packed object set is traversed according to the initial position information and the initial geometry information to determine a constraint state of each direction. The priority diagram of the to-be-packed object set is determined according to constraint states.

Specifically, the initial position information and the initial geometry information are obtained, and the space in each direction of each to-be-packed object is traversed by using a traversal algorithm, and the constraint state of each direction is determined. For example, the space in the upwards vertical direction of the current to-be-packed object is traversed, and if there are other to-be-packed objects, then a corresponding top block identification, such as "TB", is established between the current to-be-packed object and each of the other to-be-packed objects. The space above a middle position of the left side of the current to-be-packed object is traversed, and if there are other to-be-packed objects, then a corresponding left access block identification, such as "LAB", is established between the current to-be-packed object and each of the other to-be-packed objects.

The space above a middle position of the right side of the current to-be-packed object is traversed, and if there are other to-be-packed objects, then a corresponding right access block identification, such as "RAB", is established between the current to-be-packed object and each of the other to-be-packed objects. FIG. 6 is a schematic view illustrating a process of establishing the priority diagram according to an embodiment. As shown in FIG. 6, in the priority diagram, the single-arrow solid line represents the top block identification such as TB, the single-arrow dashed line represents the left access block identification such as LAB, and a double-arrow dashed line represents the right access block identification such as RAB. By traversing and analyzing the space in each direction of each to-be-packed object, it is determined whether there are other to-be-packed objects in each direction of each to-be-packed object. According to the traversal result, the constraint state of each to-be-packed object is determined to obtain the priority diagram of the to-be-packed object set, thereby ascertaining the states of the to-be-packed objects in the initial container, and reducing transfer-and-pack time and improving the packing efficiency.

In this embodiment, the initial position information and the initial geometry information of each to-be-packed object in the to-be-packed object set in the initial container are obtained, and the priority diagram of the to-be-packed object set is determined by performing the geometrical analysis on each to-be-packed object in the to-be-packed object set according to the initial position information and the initial geometry information. The change of the dependence information of to-be-packed objects in the initial container in the packing process is obtained according to the priority diagram, and the strategy of arranging the object in the target container is continuously optimized according to the changed dependence information, thereby improving the packing effect and the space utilization ratio of the target container.

Figure 7:
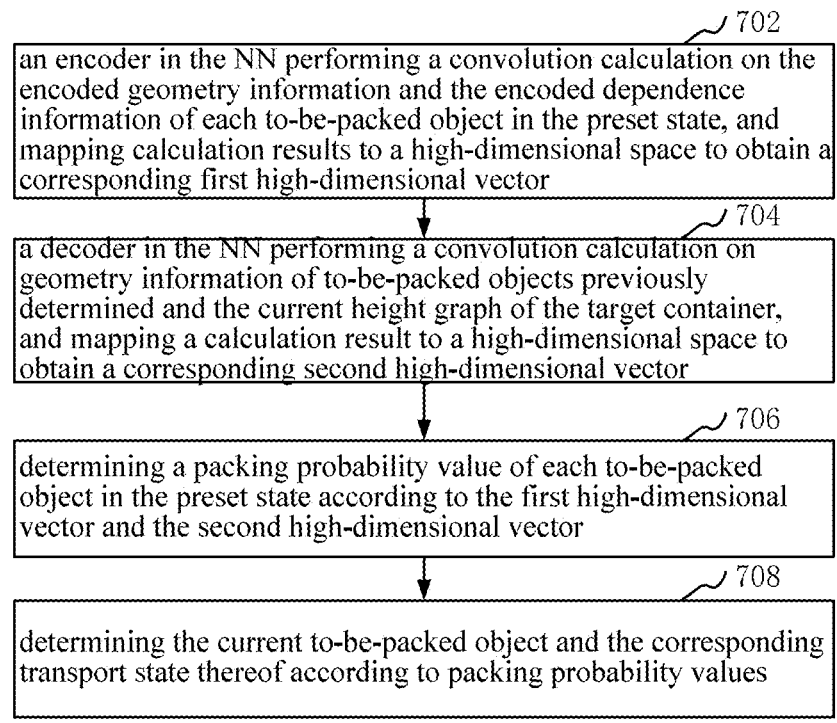
FIG. 7 is a schematic flowchart of determining a current to-be-packed object and a corresponding transport state according to an embodiment.

In an embodiment, as shown in FIG. 7, a process for determining the packing sequence of the objects is provided. In this embodiment, taking the process applied to the terminal as an example, the process includes the following step 702 to step 708.

At step 702, the encoder in the NN performs a convolution calculation on the encoded geometry information and the encoded dependence information of each to-be-packed object in the preset state, and maps calculation results to a high-dimensional space to obtain a corresponding first high-dimensional vector.

Specifically, the inputs of the convolutional layer of the encoder are the geometry information of each to-be-packed object in the preset state and the dependence information in the priority diagram. The geometry information is static, and the dependence information is dynamic. The convolution calculation is performed on the geometry information and the dependence information of each to-be-packed object, and the calculation results are mapped to the high-dimensional space to obtain the first high-dimensional vector e, which records each input information.

At step 704, the decoder in the NN performs a convolution calculation on the geometry information of to-be-packed objects previously determined and the current height graph of the target container, and maps the calculation result to a high-dimensional space to obtain a corresponding second high-dimensional vector.

The decoder includes a recurrent neural network (RNN), which accumulates the transport state, the geometry information, and the dependence information of the to-be-packed object which was determined each time during the packing process. The RNN includes two inputs. A first input is an accumulated vector obtained by performing the convolution calculation on the geometry information of the to-be-packed objects previously determined and the current height graph of the target container. The second input is a second high-dimensional vector outputted by the RNN in the process of determining the last to-be-packed object.

Specifically, the decoder performs the convolution calculation on the last output of the attention mechanism namely the geometry information of the to-be-packed objects previously determined, and the current height graph of the target container through the convolution layer. Based on an input of the last output of the RNN, the decoder maps the calculation result to the high-dimensional space to obtain the corresponding second high-dimensional vector. The output vector of the decoder includes the transport states and geometry information of all to-be-packed objects previously determined.

At step 706, a packing probability value of each to-be-packed object in the preset state is determined according to the first high-dimensional vector and the second high-dimensional vector.

Specifically, the first high-dimensional vector and the second high-dimensional vector are inputted into the attention mechanism, and the packing probability value of each to-be-packed object in the preset state is calculated.

At step 708, the current to-be-packed object and a corresponding transport state thereof are determined according to packing probability values.

Specifically, the packing probability value of the maximum value is selected from the calculated packing probability values, the to-be-packed object and the corresponding preset state thereof corresponding to the packing probability value of the maximum value are determined. The to-be-packed object and the corresponding preset state thereof corresponding to the packing probability value of the maximum value are determined to be the current to-be-packed object and the corresponding transport state thereof, respectively. The packing sequence of the objects in the to-be-packed object set is obtained according to all determined current to-be-packed objects.

In an embodiment, after determining the current to-be-packed object and a corresponding transport state thereof, the method further includes: removing the determined current to-be-packed object from the to-be-packed object set, updating the priority diagram of the to-be-packed object set and a current height graph of the target container, and jumping to perform the step of obtaining the priority diagram of the to-be-packed object set in the initial container.

Specifically, the encoder in the NN performs the convolution calculation on the geometry information and the dependence information of each to-be-packed object, and maps the calculation result to the high-dimensional space to obtain the corresponding first high-dimensional vector. The decoder in the NN performs the convolution calculation on the geometry information of the to-be-packed objects previously determined and the current height graph of the target container, maps the calculation result to the high-dimensional space to obtain the corresponding second high-dimensional vector. The packing probability value of each to-be-packed object in the preset state is determined according to the first high-dimensional vector and the second high-dimensional vector. The current to-be-packed object and the corresponding transport state are determined according to the packing probability values, and the determined current to-be-packed object is removed from the to-bepacked object set. The priority diagram of the to-be-packed object set and the current height graph of the target container are updated, and the step of obtaining the priority diagram of the to-be-packed object set in the initial container is then performed. By updating the to-be-packed objects in the to-be-packed object set in the initial container and the priority diagram, target positions of the to-be-packed objects in the target container are determined, thereby improving the rationality of the layout of the packed objects, and further improving the rationality of the space utilization of the target container and the efficiency of the transport-and-pack.

Figure 8:
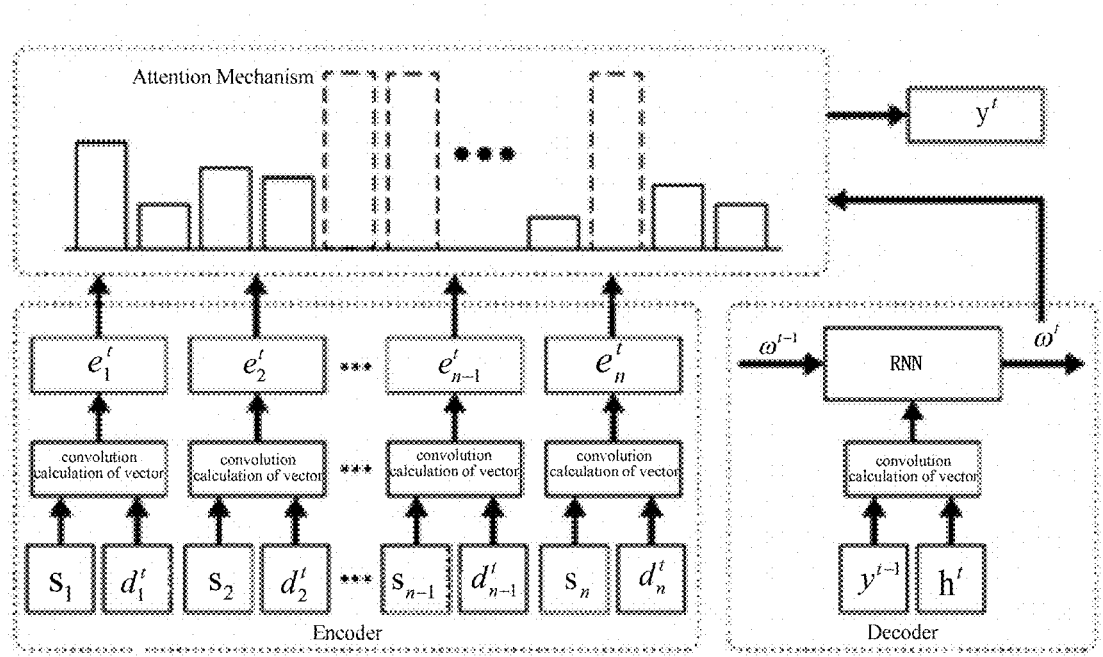
FIG. 8 is a schematic structural view illustrating a neural network (NN) of a TAP-Net according to an embodiment.

In an embodiment, FIG. 8 is a schematic structural view illustrating the NN of a TAP-Net. As shown in FIG. 8, the NN of the TAP-Net includes an encoder and a decoder with the attention mechanism. The process of obtaining the packing sequence of the objects in the to-be-packed object set by the NN of the TAP-Net is illustrated as follows. Each to-be-packed object has two different states, namely a translational state and a rotational state. n to-be-packed objects in the to-be-packed object set correspondingly have 2n states. The NN of the TAP-Net only outputs n states. When the TAP-Net processes the transport-and-pack of n to-be-packed objects, the NN of the TAP-Net repeats the step of determining the current to-be-packed object and the corresponding transport state for n times. When the step of determining the current to-be-packed object and the corresponding transport state is performed for the t-th time, the inputs of the encoder are represented as $\{s_i, d_i^t\}$, where $s_i=\{w_i, h_i\}_{i=1 \ldots m}$, and $s_i$ represents the static position information of an i-th to-be-packed object, which includes the width $w_i$ and the height $h_i$ of the i-th to-be-packed object. $d_i^t$ represents the dynamic dependence information of the i-th to-be-packed object when the step of determining the current to-be-packed object and the corresponding transport state is performed for the t-th time. The inputs of the decoder include the state $y^{t-1}$ selected when the step of determining the current to-be-packed object and the corresponding transport state is performed for the (t−1)-th time, and the current height graph $h^t$ of the target container, and the output $\omega^{t-1}$ of the RNN when the step of determining the current to-be-packed object and the corresponding transport state is performed for the (t−1)-th time.

The encoder converts the input $\{w_i, d_i^t\}$ into the first high-dimensional vector $e_i^t$, and the decoder converts the inputs $y^{t-1}$ and $h^t$ into the second high-dimensional vector $\omega^t$. The attention mechanism calculates 2n probability values corresponding to 2n states according to the data of these high-dimensional vectors $e_i^t$ and $\omega^t$. The transport state of the to-be-packed object with the maximum probability among 2n probability values is selected to be the current output $y^t$. The determined current to-be-packed object is removed from the to-be-packed object set, and the priority diagram of the to-be-packed object set in the initial container is updated. This process repeats until the packing sequence of the n to-be-packed objects is obtained, that is, until the packing sequence $\{y^t\}_{t=1 \ldots m}$ of the objects in the to-be-packed object set is obtained. When the TAP-Net calculates for the first time, the value $y^{t-1}$ is an initial value, and the initial value may be zero.

In the above process of determining the packing sequence of the objects, the encoder in the NN performs the convolution calculation on the geometry information and the dependence information of each to-be-packed object, and maps the calculation result to the high-dimensional space to obtain the corresponding first high-dimensional vector. The decoder in the NN performs the convolution calculation on the geometry information of the to-be-packed objects previously determined and the current height graph of the target container, and maps the calculation result to the high-dimensional space to obtain the corresponding second high-dimensional vector. The packing probability value of each to-be-packed object in the preset state is determined according to the first high-dimensional vector and the second high-dimensional vector, and the current to-be-packed object and the corresponding transport state thereof are determined according to the packing probability values. The packing sequence of the objects in the to-be-packed object set is generated according to all the determined current to-be-packed objects. The current to-be-packed object and the corresponding transport state are determined in sequence according to the priority diagram of to-be-packed objects in the initial container and the current height graph of the target container, thereby ensuring the rationality and the accuracy of the transport-and-pack.

Figure 9:
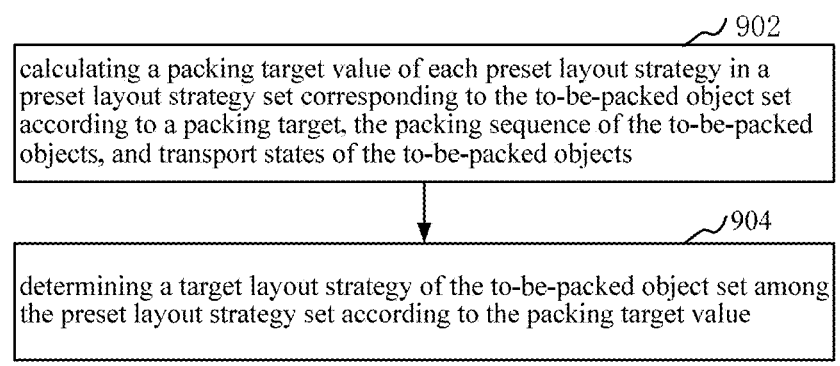
FIG. 9 is a schematic flowchart of determining a target layout strategy according to an embodiment.

In an embodiment, as shown in FIG. 9, a process for determining a target layout strategy is provided, and taking the process applied to the terminal as an example, the process includes the following step 902 to step 904.

At step 902, a packing target value of each preset layout strategy in a preset layout strategy set corresponding to the to-be-packed object set is calculated according to a packing target, the packing sequence of the objects, and the transport states of the to-be-packed objects.

The packing target includes at least one of a compactness target, a conical degree target, and a stability target. The packing target value includes at least one of a compactness value, a conical degree value, and a stability value. The packing target value R may be represented by, but is not limited to the following equation:

$$R=(C+P+S)/3$$

Figures 10A, 10B, 10C, 10D:
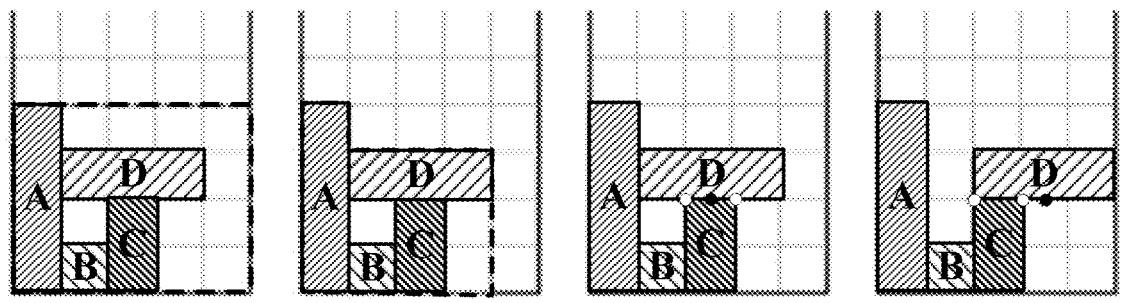
FIGS. 10A-10D are schematic views illustrating effects of a compactness value, a conical degree value, and a stability value according to an embodiment.

Where, the compactness value C is defined as the total area $A_{packed}$ of all to-be-packed objects to the area $A_{rect}$ of a rectangle determined by the largest height and the width of the target container. As shown in FIG. 10A, $$C = \frac{10}{4 \times 5},$$

a consideration for the compactness tends to make the objects to be packed tightly, and the compactness value C is 1 only if all to-be-packed objects fully fill the rectangular area. Optionally, the compactness value C may range from 0 to 1.

The conical degree value P is defined as the ratio of the total area $A_{packed}$ of all to-be-packed objects to the projected area $A_{proj}$ of all to-be-packed objects projected onto the bottom of the target container. As shown in FIG. 10B, $$P = \frac{10}{13}.$$

The area outside the projected area is allowed to be filled by other objects to be packed. If the current state enables subsequent objects to be packed tightly, the conical degree value P is larger. Optionally, the conical degree value P may range from 0 to 1.

The stability value S is defined as a ratio of the number $N_{stable}$ of stable objects to the total number $N_{packed}$ of the packed objects. Optionally, the stability value S may range from 0 to 1. During the packing process, the stability judgment of each to-be-packed object includes following steps. Firstly, through geometrical analysis, all contact points between the lower surface of the to-be-packed object at the current position and the edges of the packed object are found out, and the center point of the lower surface of the to-be-packed object is found out. Then adjacent contact points are connected to form the outlined area. In the case of the two-dimensional object, the outlined area is a line segment, and in the case of the three-dimensional object, the outlined area is a polygon. Finally, it is judged whether the center point is in the outlined area. If the center point is in the outlined area, it is determined that the to-be-packed object is stable, otherwise, it is determined that the to-be-packed object is unstable. As shown in FIGS. 10C and 10D, the stability value of FIG. 10C is $$S = \frac{4}{4},$$

which is greater than the stability value of FIG. 10D which is $$S = \frac{3}{4},$$

that is, the packing effect shown in FIG. 10C is better than the packing effect shown in FIG. 10D.

At step 904, the target layout strategy of the to-be-packed object set is determined among the preset layout strategy set according to the packing target value.

Specifically, the packing target includes at least one of the compactness target, the conical degree target and the stability target. The calculating the packing target value of each preset layout strategy in the preset layout strategy set corresponding to the to-be-packed object set according to the packing target, the packing sequence of the objects, and the transport states of the to-be-packed objects includes following steps. The to-be-packed objects in the to-be-packed object set are packed into the target container in sequence according to the packing sequence of the objects, the transport state of each to-be-packed object and the preset layout strategy. The compactness value, the conical degree value, and the stability value corresponding to the target container after packing are calculated. The packing target value corresponding to each preset layout strategy in the preset layout strategy set is calculated according to the compactness value, the conical degree value, and the stability value. The preset layout strategy with the maximum packing target value among the calculated packing target values is obtained, and the preset layout strategy with the maximum packing target value is determined to be the target layout strategy of the to-be-packed object set.

In the above determination of the target layout strategy, the packing target value of each preset layout strategy in the preset layout strategy set corresponding to the to-be-packed object set is calculated according to the packing target, the packing sequence of the objects, and the transport states of the to-be-packed objects. The target layout strategy of the to-be-packed object set is determined among the preset layout strategy set according to the packing target value. By calculating the packing target value of each preset layout strategy in the preset layout strategy set corresponding to the to-be-packed object set, and by comparing the packing target values, the optimal preset layout strategy is determined, thereby improving the space utilization of the target container.

Figure 11:
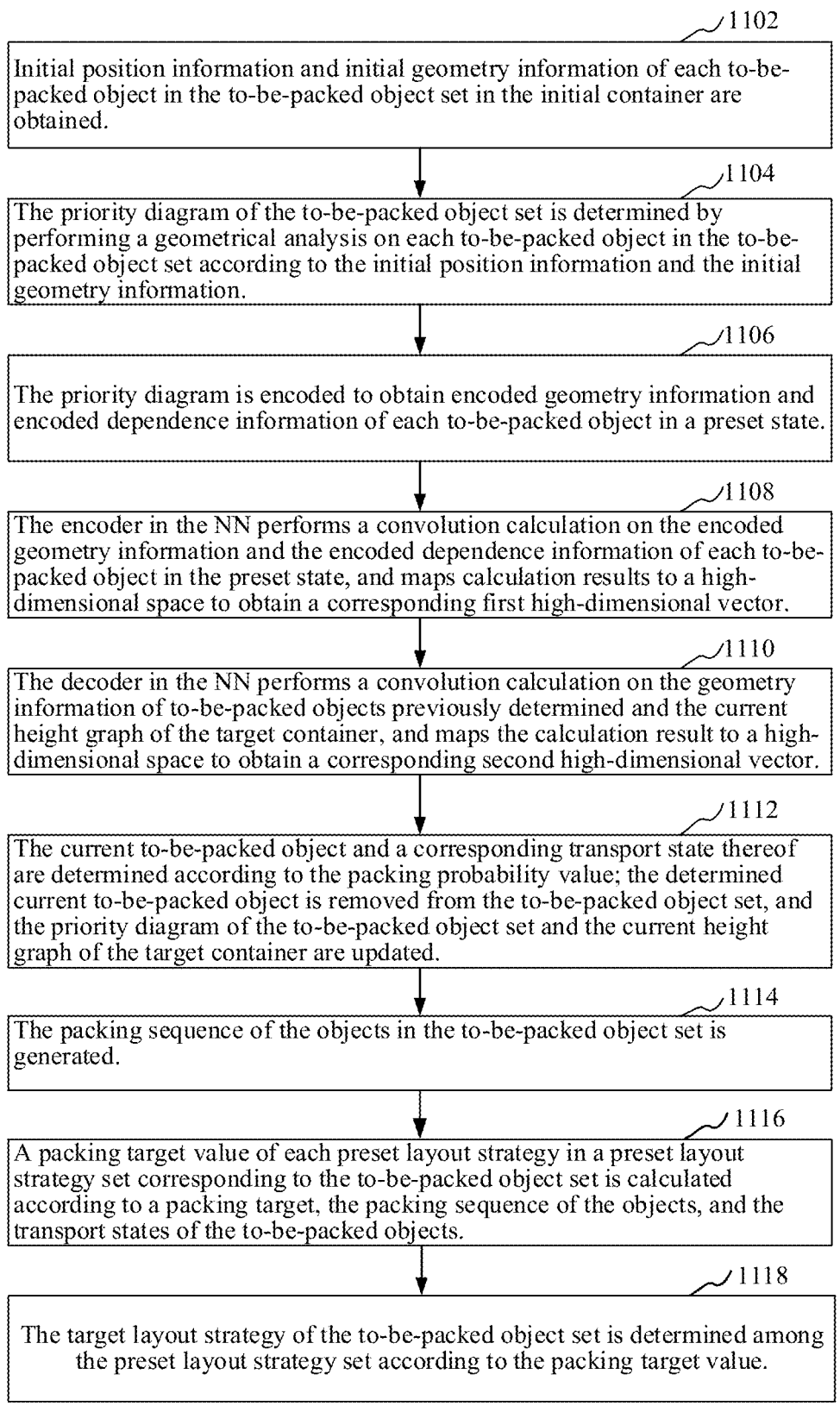
FIG. 11 is a schematic flowchart of the method for generating the strategy of the object transport-and-pack process according to another embodiment.

In another embodiment, as shown in FIG. 11, a method for generating the strategy of the object transport-and-pack process is provided, and taking the method applied to the terminal as an example, the method includes the following step 1102 to step 1118.

At step 1102, initial position information and initial geometry information of each to-be-packed object in the to-be-packed object set in the initial container are obtained.

At step 1104, the priority diagram of the to-be-packed object set is determined by performing a geometrical analysis on each to-be-packed object in the to-be-packed object set according to the initial position information and the initial geometry information.

At step 1106, the priority diagram is encoded to obtain encoded geometry information and encoded dependence information of each to-be-packed object in a preset state.

At step 1108, the encoder in the NN performs a convolution calculation on the encoded geometry information and the encoded dependence information of each to-be-packed object in the preset state, and maps calculation results to a high-dimensional space to obtain a corresponding first high-dimensional vector.

At step 1110, the decoder in the NN performs a convolution calculation on the geometry information of to-be-packed objects previously determined and the current height graph of the target container, and maps the calculation result to a high-dimensional space to obtain a corresponding second high-dimensional vector.

At step 1112, a current to-be-packed object and a corresponding transport state thereof are determined according to the packing probability value. The determined current to-be-packed object is removed from the to-be-packed object set, and the priority diagram of the to-be-packed object set and the current height graph of the target container are updated.

At step 1114, the packing sequence of the objects in the to-be-packed object set is generated.

Figure 12:
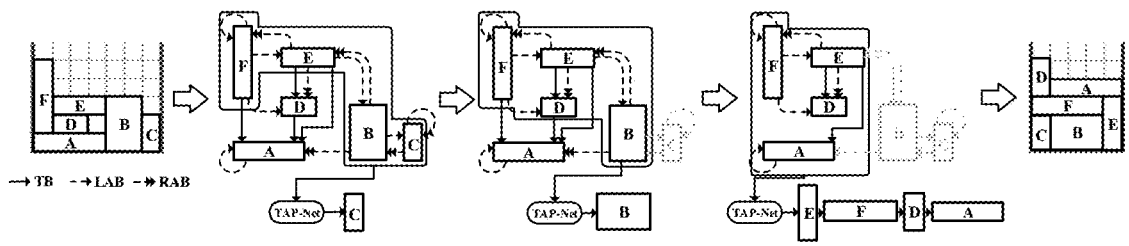
FIG. 12 is a schematic view illustrating the method for generating the strategy of the object transport-and-pack process applied to a rolling packing according to an embodiment.

Optionally, when the NN of the TAP-Net is trained, the capacity of the TAP-Net is determined according to the number N of training objects. When there are M (M>N) to-be-packed objects in the initial container, a set (Ω) having N objects may be selected for the transport-and-pack by means of the TAP-Net. After the current to-be-packed object and the corresponding transport state are determined, the current to-be-packed object is removed from the initial container, and another to-be-packed object is added to the set Ω, and the priority diagram of the to-be-packed object set and the current height graph of the target container are updated. The foregoing process repeats until the packing sequence of all objects is determined, and the packing sequence of objects in the to-be-packed object set is obtained. As shown in FIG. 12, there are 6 to-be-packed objects in the initial container. When the TAP-Net is trained by four objects and there are six to-be-packed objects, four objects are selected to construct the initial set Ω at first, and then the first to-be-packed object, such as an object C, is selected by the TAP-Net. After the to-be-packed object C is removed, another object, such as an object F, is added to the set Ω. The foregoing process repeats until all objects are packed.

At step 1116, a packing target value of each preset layout strategy in a preset layout strategy set corresponding to the to-be-packed object set is calculated according to a packing target, the packing sequence of the objects, and the transport states of the to-be-packed objects.

At step 1118, the target layout strategy of the to-be-packed object set is determined among the preset layout strategy set according to the packing target value.

Figure 13:
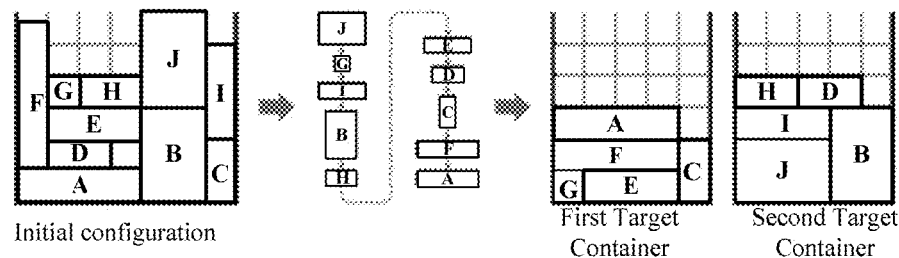
FIG. 13 is schematic view illustrating transporting and packing the objects into different target containers according to an embodiment.

Optionally, in an embodiment, each to-be-packed object in the to-be-packed object set needs to be packed into a different target container. The target container number corresponding to each to-be-packed object is obtained. A convolution calculation is performed on the target container number corresponding to each to-be-packed object, and the geometry information and the dependence information of each to-be-packed object. The calculation results are mapped to the high-dimensional space to obtain the corresponding first high-dimensional vector. The decoder in the NN performs the convolution calculation on the geometry information of the to-be-packed objects previously determined and the current height graph of the target container corresponding to each target container number, and maps the calculation result to the high-dimensional space to obtain the corresponding second high-dimensional vector. The current to-be-packed object, a corresponding transport state thereof, and the corresponding target container are determined according to the packing probability value. The determined current to-be-packed object is removed from the to-be-packed object set, and the priority diagram of the to-be-packed object set and the current height graph of the target container are updated. The packing sequence of the objects in different target containers is generated for the to-be-packed object set. The step of calculating the packing target value of each preset layout strategy in the preset layout strategy set corresponding to the to-be-packed object set according to the packing target, the packing sequence of the objects, and the transport states of to-be-packed objects is performed. As shown in FIG. 13, the initial configuration in the initial container includes to-be-packed objects A to J. The above steps are performed to pack the to-be-packed objects into a first target container and a second target container, respectively.

In the above method for generating the strategy of the object transport-and-pack process, the initial position information and the initial geometry information of each to-be-packed object in the to-be-packed object set in the initial container are obtained. The priority diagram of the to-be-packed object set is determined by performing a geometrical analysis on each to-be-packed object in the to-be-packed object set according to the initial position information and the initial geometry information. The priority diagram is encoded to obtain the encoded geometry information and the encoded dependence information of each to-be-packed object in a preset state. The encoder in the NN performs a convolution calculation on the encoded geometry information and the encoded dependence information of each to-be-packed object in the preset state, and maps calculation results to a high-dimensional space to obtain a corresponding first high-dimensional vector. The decoder in the NN performs a convolution calculation on the geometry information of to-be-packed objects previously determined and the current height graph of the target container, and maps the calculation result to a high-dimensional space to obtain a corresponding second high-dimensional vector. The current to-be-packed object and a corresponding transport state thereof are determined according to the packing probability value. The determined current to-be-packed object is removed from the to-be-packed object set, and the priority diagram of the to-be-packed object set and the current height graph of the target container are updated. The packing sequence of the objects in the to-be-packed object set is generated.

The packing target value of each preset layout strategy in the preset layout strategy set corresponding to the to-be-packed object set is calculated according to the packing target, the packing sequence of the objects, and the transport states of the to-be-packed objects. The target layout strategy of the to-be-packed object set is determined among the preset layout strategy set according to the packing target value. By determining the priority diagram of the to-be-packed object set, the constraints between to-be-packed objects are transferred and laid out according to the priority diagram, thereby improving the efficiency of the transport-and-pack and the space utilization ratio of the target container.

In an embodiment, a pack of object is a pack of three-dimensional object. The priority diagram of the to-be-packed object set in the initial container is obtained. The priority diagram is configured to describe the dependence constraints between the to-be-packed objects in the to-be-packed object set. The encoded geometry information and the encoded dependence information of each to-be-packed object in the preset state are obtained by encoding the priority diagram through the NN. The convolution calculation is performed on the encoded geometry information and the encoded dependence information of each to-be-packed object in the to-be-packed object set, and the current height graph of the target container in sequence, and the current to-be-packed objects and the corresponding transport states thereof are determined, and to obtain the packing sequence of objects in the to-be-packed object set. The strategy of the packing process of the to-be-packed object set is determined according to the packing target, the packing sequence of the objects, the transport state and the preset layout strategy of each to-be-packed object. By determining the priority diagram of the to-be-packed object set, the constraints between to-be-packed objects are transferred and laid out according to the priority diagram, thereby improving the efficiency of the transport-and-pack. Optionally, for the specific limitations of the method for generating the strategy of a three-dimensional object transport-and-pack process, please refer to the limitations of the method for generating the strategy of the two-dimensional object transport-and-pack process above, and they will not be repeatedly described hereinafter.

It should be understood that, although the steps in the flowcharts of FIG. 1, FIG. 5, FIG. 7, FIG. 9, and FIG. 11 are shown in sequence indicated by arrows, but these steps are not necessarily executed in the order indicated by the arrows. Unless explicitly stated herein, these steps are not necessarily performed strictly according to an order, and these steps may be performed in any other order. Moreover, at least part of the steps in FIG. 1, FIG. 5, FIG. 7, FIG. 9, and FIG. 11 may include multiple steps or multiple stages, and these steps or stages are not necessarily executed and completed at the same time, but may be executed at different times. These steps or stages are not necessarily executed in sequence, but may be performed in turn or alternately with other steps or with at least a portion of steps or stages in the other steps.

Figure 14:
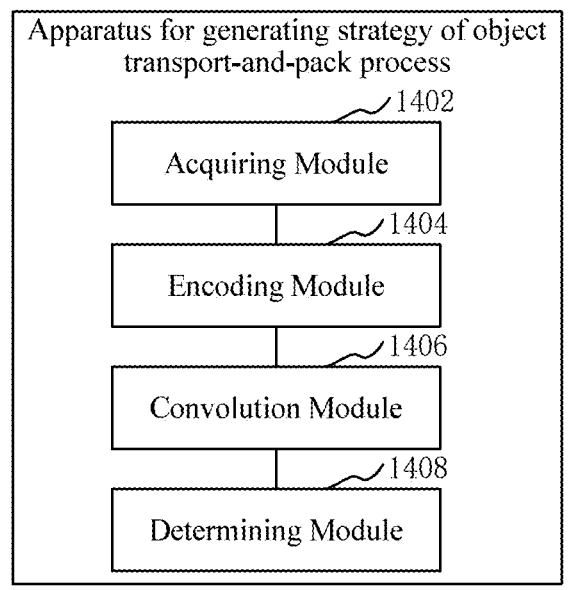
FIG. 14 is a schematic structural view illustrating an apparatus for generating a strategy of an object transport-and-pack process according to an embodiment.

In an embodiment, as shown in FIG. 14, an apparatus for generating a strategy of an object transport-and-pack process is provided, and includes an acquiring module 1402, an encoding module 1404, a convolution module 1406, and a determining module 1408.

The acquiring module 1402 is configured to obtain a priority diagram of a to-be-packed object set in an initial container. The priority diagram is configured to describe dependence constraints between to-be-packed objects in the to-be-packed object set.

The encoding module 1404 is configured to encode the priority diagram to obtain the encoded geometry information and the encoded dependence information of each to-be-packed object in a preset state.

The convolution module 1406 is configured to perform a convolution calculation on the encoded geometry information and the encoded dependence information of each to-be-packed object in the to-be-packed object set in the preset state, and a current height graph of a target container by the NN, and to determine a current to-be-packed object and a corresponding transport state thereof, and to generate a packing sequence of the objects in the to-be-packed object set.

The determining module 1408 is configured to determine a strategy of a packing process of the to-be-packed object set according to a packing target, the packing sequence of the objects, and the transport state of each to-be-packed object and a preset layout strategy of each to-be-packed object.

In the above apparatus for generating the strategy of the object transport-and-pack process, the priority diagram of the to-be-packed object set in the initial container is obtained. The priority diagram is configured to describe the dependence constraints between the to-be-packed objects in the to-be-packed object set. The encoded geometry information and the encoded dependence information of each to-be-packed object in the preset state are obtained by encoding the priority diagram through the NN. The convolution calculation is performed on the encoded geometry information and the encoded dependence information of each to-be-packed object in the to-be-packed object set, and the current height graph of the target container in sequence, so that the current to-be-packed objects and the corresponding transport states thereof are determined to obtain the packing sequence of objects in the to-be-packed object set. The strategy of the packing process of the to-be-packed object set is determined according to the packing target, the packing sequence of the objects, and the transport state and the preset layout strategy of each to-be-packed object. By determining the priority diagram of the to-be-packed object set, the constraints between to-be-packed objects are transferred and laid out according to the priority diagram, thereby solving the problem of the transport-and-pack of the object, and improving the efficiency of the transport-and-pack of the object.

Figure 15:
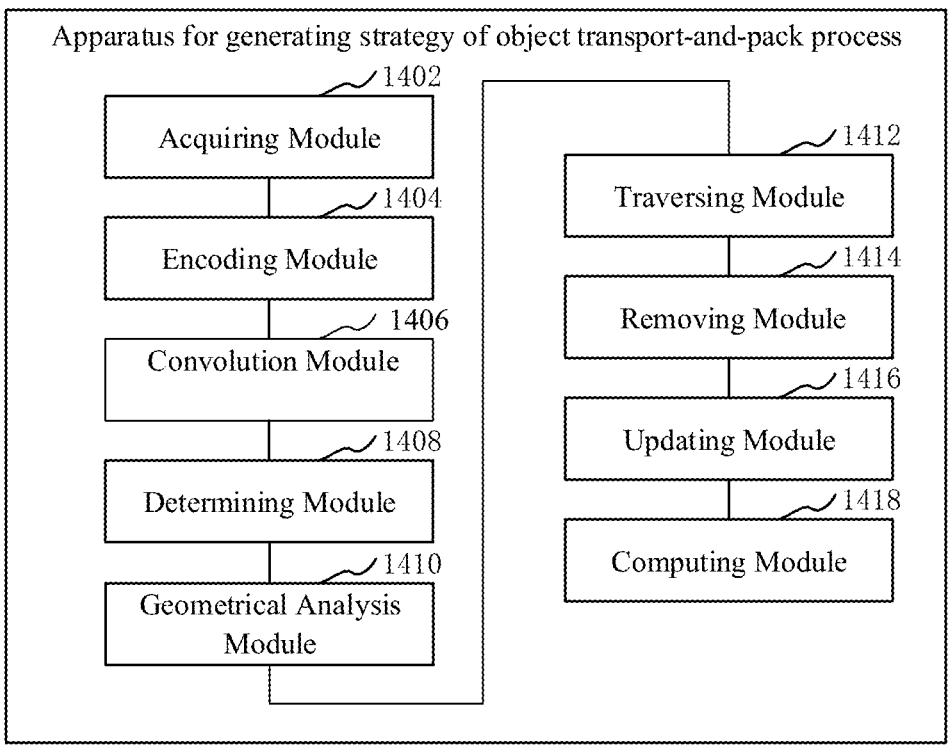
FIG. 15 is a schematic structural view illustrating the apparatus for generating the strategy of the object transport-and-pack process according to another embodiment.

In an embodiment, as shown in FIG. 15, the acquiring module 1402 is further configured to obtain initial position information and initial geometry information of each to-be-packed object in the to-be-packed object set in the initial container.

The apparatus for generating the strategy of the object transport-and-pack process further includes a geometrical analysis module 1410, a traversing module 1412, a removing module 1414, an updating module 1416, and a computing module 1418.

The geometrical analysis module 1410 is configured to perform a geometrical analysis on each to-be-packed object in the to-be-packed object set according to the initial position information and the initial geometry information to determine the priority diagram of the to-be-packed object set.

The traversing module 1412 is configured to traverse space in each direction of each to-be-packed object according to the initial position information and the initial geometry information to determine a constraint state of each direction, and configured to determine the priority diagram of the to-be-packed object set according to the constraint state.

In an embodiment, the convolution module 1406 is further configured to: perform a convolution calculation on the geometry information and the dependence information of each to-be-packed object in the preset state, and map calculation results to a high-dimensional space by mean of an encoder in the NN, to obtain a corresponding first high-dimensional vector, perform a convolution calculation on the geometry information of to-be-packed objects previously determined and the current height graph of the target container, and map the calculation result to a high-dimensional space by means of a decoder in the NN, to obtain a corresponding second high-dimensional vector; determine a packing probability value of each to-be-packed object in the preset state according to the first high-dimensional vector and the second high-dimensional vector; determine the current to-be-packed object and a corresponding transport state thereof according to the packing probability value.

The removing module 1414 is configured to remove the determined current to-be-packed object from the to-be-packed object set.

The updating module 1416 is configured to update the priority diagram of the to-be-packed object set and a current height graph of the target container and jump to perform the step of obtaining the priority diagram of the to-be-packed object set in the initial container.

The computing module 1418 is configured to calculate a packing target value of each preset layout strategy in a preset layout strategy set corresponding to the to-be-packed object set according to a packing target, the packing sequence of the objects, and the transport states of the to-be-packed objects.

In an embodiment, the computing module 1418 is further configured to pack the to-be-packed objects in the to-be-packed object set into the target container in sequence according to the packing sequence of the objects, the transport state of each to-be-packed object and the preset layout strategy, and calculate the compactness value, the conical degree value, and the stability value corresponding to the target container after packing.

In an embodiment, the determining module 1408 is further configured to determine the target layout strategy of the to-be-packed object set among the preset layout strategy set according to the packing target value. The packing target includes at least one of the compactness target, the conical degree target and the stability target.

In an embodiment, the determining module 1408 is further configured to calculate the packing target value corresponding to each preset layout strategy in the preset layout strategy set according to the compactness value, the conical degree value, and the stability value.

In the above apparatus for generating the strategy of the object transport-and-pack process, the initial position information and the initial geometry information of each to-be-packed object in the to-be-packed object set in the initial container are obtained. The priority diagram of the to-be-packed object set is determined by performing a geometrical analysis on each to-be-packed object in the to-be-packed object set according to the initial position information and the initial geometry information. The priority diagram is encoded to obtain the encoded geometry information and the encoded dependence information of each to-be-packed object in a preset state. The encoder in the NN performs a convolution calculation on the encoded geometry information and the encoded dependence information of each to-be-packed object in the preset state, and maps calculation results to a high-dimensional space to obtain a corresponding first high-dimensional vector. The decoder in the NN performs a convolution calculation on the geometry information of to-be-packed objects previously determined and the current height graph of the target container, and maps the calculation result to a high-dimensional space to obtain a corresponding second high-dimensional vector. The packing probability value of each to-be-packed object in the preset state is determined according to the first high-dimensional vector and the second high-dimensional vector. The current to-be-packed object and a corresponding transport state thereof are determined according to the packing probability value. The determined current to-be-packed object is removed from the to-be-packed object set. The priority diagram of the to-be-packed object set and the current height graph of the target container are updated. Jump to perform the step of obtaining the priority diagram of the to-be-packed object set in the initial container. The packing sequence of the objects in the to-be-packed object set is generated.

The to-be-packed objects in the to-be-packed object set are packed into the target container in sequence according to the packing sequence of the objects, the transport state of each to-be-packed object and the preset layout strategy. The compactness value, the conical degree value, and the stability value corresponding to the target container after packing are calculated according to the packing target. The packing target value corresponding to each preset layout strategy in the preset layout strategy set is calculated according to the compactness value, the conical degree value, and the stability value. The target layout strategy of the to-be-packed object set is determined among the preset layout strategy set. By determining the priority diagram of the to-be-packed object set, the constraints between to-be-packed objects are transferred and laid out according to the priority diagram, thereby improving the efficiency of the transport-and-pack and the space utilization ratio of the target container.

For the specific limitation on the apparatus for generating the strategy of the object transport-and-pack process, please refer to the limitation on the method for generating the strategy of the object transport-and-pack process above, which will not be repeatedly described hereinafter. Each module in the above-mentioned apparatus for generating the strategy of the object transport-and-pack process can be implemented in whole or in part by software, hardware or combinations thereof. The above modules can be embedded in or independent of a processor in the computer device in the form of hardware, or can be stored in a memory in the computer device in the form of software, so that the processor can call and execute operations corresponding to the above modules.

Figure 16:
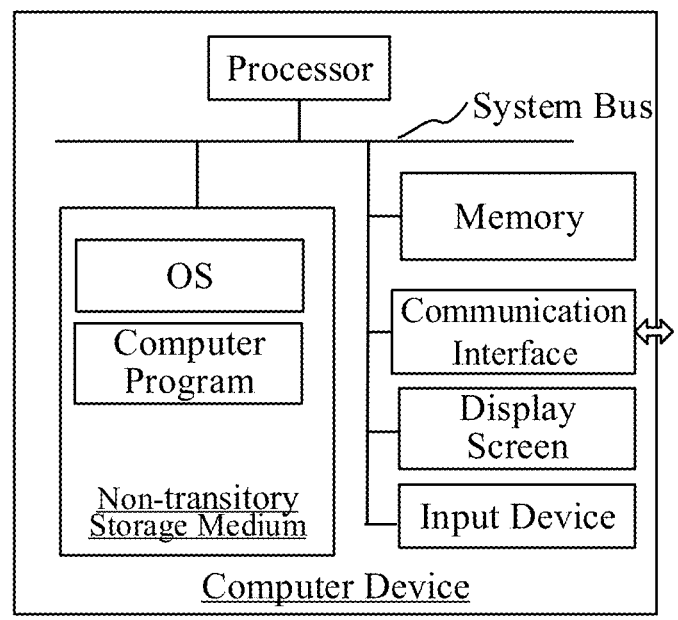
FIG. 16 is a schematic view illustrating an internal structure of a computer device according to an embodiment.

In an embodiment of the present disclosure, a computer device is provided, the computer device may be a terminal, and an internal structure view thereof may be shown in FIG. 16. The computer device includes a processor, a memory, a communication interface, a display screen, and an input device that are connected by a system bus. The processor of the computer device is configured to provide computing and control capabilities. The memory of the computer device includes a non-transitory storage medium, a memory. The non-transitory storage medium stores an operating system and a computer program. The memory provides an environment for running the operating system and the computer program in the non-transitory storage medium. The communication interface of the computer device is configured for wired or wireless communication with an external terminal. The wireless communication can be realized by WIFI, operator network, near field communication (NFC) or other technologies. The computer program, when executed by the processor, implements the method for generating the strategy of the object transport-and-pack process. The display screen of the computer device may be a liquid crystal display screen or an electronic ink display screen. The input device of the computer device may be a touch layer covering the display screen, or a button, a trackball or a touchpad provided on a housing of the computer device, or an external keyboard, a trackpad, or a mouse.

Those skilled in the art should understand that the structure shown in FIG. 16 is only a block diagram of part of the structure related to the solutions of the present disclosure, but not constitutes a limitation on the computer device, to which the solutions of the present disclosure is applied. The specific computer device may include more or less parts than those shown in the figure, or combine some parts, or have a different layout of parts.

In an embodiment, a computer device is provided. The computer device includes a memory and a processor. A computer program is stored on the memory. The processor, when executing the computer program, performs the method of any one of the embodiments above.

In an embodiment, a non-transitory computer-readable storage medium is provided, and a computer program is stored on the non-transitory computer-readable storage medium. The computer program, when being executed by a processor, performs the method of any one of the embodiments above.

A person of ordinary skill in the art should understand that all or part of the processes in the method of the above embodiments may be implemented by means of a computer program instructing relevant hardware. The computer program may be stored in a non-transitory computer readable storage medium. When the computer program is executed, the procedures of the embodiments of the above method may be included. Any reference to the memory, the storage, the database or other medium used in the embodiments provided by the present disclosure may include at least one of non-transitory memory and transitory memory. The non-transitory memory may include read-only memory (ROM), magnetic tape, floppy disk, flash memory, or optical memory. The transitory memory may include random access memory (RAM) or external cache memory. As an illustration but not a limitation, RAM can be in various forms, such as static random access memory (SRAM) or dynamic random access memory (DRAM), etc.

The technical features of the above embodiments may be combined arbitrarily. In order to make the description concise, not all possible combinations of the technical features of the above embodiments are described. However, as long as there is no contradiction in the combination of these technical features, any combination should be within the range described in this description.

The above examples are only several embodiments of the present disclosure, and the descriptions thereof are more specific and detailed, but they should not be understood to be a limitation on the scope of the present application. It should be noted that, for those of ordinary skill in the art, several modifications and improvements may be made without departing from the concept of the present disclosure, and all these modifications and improvements fall within the protection scope of the present disclosure. Therefore, the protection scope of the present disclosure shall be subject to the appended claims.

What is claimed is:

1. A method for generating a strategy of an object transport-and-pack process, comprising:
   obtaining a priority diagram of a to-be-packed object set in an initial container, the priority diagram being configured to describe dependence constraints between to-be-packed objects in the to-be-packed object set;

encoding the priority diagram to obtain encoded geometry information and encoded dependence information of each to-be-packed object in a preset state;

performing, by a neural network (NN), a convolution calculation on the encoded geometry information and the encoded dependence information of each to-be-packed object in the to-be-packed object set in the preset state, and a current height graph of a target container, and determining a current to-be-packed object and a corresponding transport state thereof;

generating a packing sequence of to-be-packed objects in the to-be-packed object set; and determining a strategy of a packing process of the to-be-packed object set according to a packing target, the packing sequence of the to-be-packed objects, and the transport state of each to-be-packed object and a preset layout strategy.

2. The method according to claim 1, wherein the obtaining the priority diagram of the to-be-packed object set in the initial container comprises:

obtaining initial position information and initial geometry information of each to-be-packed object in the to-be-packed object set in the initial container; and determining the priority diagram of the to-be-packed object set by performing a geometrical analysis on each to-be-packed object in the to-be-packed object set according to the initial position information and the initial geometry information.

3. The method according to claim 2, wherein the determining the priority diagram of the to-be-packed object set by performing the geometrical analysis on each to-be-packed object in the to-be-packed object set according to the initial position information and the initial geometry information comprises:

traversing space in each direction of each to-be-packed object in the to-be-packed object set according to the initial position information and the initial geometry information to determine a constraint state of each direction; and determining the priority diagram of the to-be-packed object set according to constraint states.

4. The method according to claim 1, wherein the performing, by the NN, the convolution calculation on the encoded geometry information and the encoded dependence information of each to-be-packed object in the to-be-packed object set in the preset state, and the current height graph of the target container, and the determining the current to-be-packed object and the corresponding transport state thereof comprise:

an encoder in the NN performing a convolution calculation on the encoded geometry information and the encoded dependence information of each to-be-packed object in the preset state, and mapping calculation results to a high-dimensional space to obtain a corresponding first high-dimensional vector;

a decoder in the NN performing a convolution calculation on geometry information of to-be-packed objects previously determined and the current height graph of the target container, and mapping a calculation result to a high-dimensional space to obtain a corresponding second high-dimensional vector;

determining a packing probability value of each to-be-packed object in the preset state according to the first high-dimensional vector and the second high-dimensional vector; and determining the current to-be-packed object and the corresponding transport state thereof according to the packing probability value.

5. The method according to claim 1, wherein after the determining the current to-be-packed object and the corresponding transport state thereof, and before the generating the packing sequence of the to-be-packed objects in the to-be-packed object set, the method further comprises:

removing a determined current to-be-packed object from the to-be-packed object set;

updating the priority diagram of the to-be-packed object set and the current height graph of the target container; and jumping to a step of obtaining the priority diagram of the to-be-packed object set in the initial container.

6. The method of claim 1, wherein the determining the strategy of the packing process of the to-be-packed object set according to the packing target, the packing sequence of the to-be-packed objects, and the transport state of each to-be-packed object and the preset layout strategy comprises:

calculating a packing target value of each preset layout strategy in a preset layout strategy set corresponding to the to-be-packed object set according to the packing target, the packing sequence of the to-be-packed objects, and transport states of the to-be-packed objects; and determining a target layout strategy of the to-be-packed object set among the preset layout strategy set according to the packing target value.

7. The method according to claim 6, wherein:

the packing target comprises at least one of a compactness target, a conical degree target and a stability target; and the calculating the packing target value of each preset layout strategy in the preset layout strategy set corresponding to the to-be-packed object set according to the packing target, the packing sequence of the to-be-packed objects, and the transport states of the to-be-packed objects comprises:

packing the to-be-packed objects in the to-be-packed object set into the target container in sequence according to the packing sequence of the to-be-packed objects, the transport state of each to-be-packed object, and the preset layout strategy;

calculating at least one of a compactness value, a conical degree value, and a stability value corresponding to the target container after packing according to the packing target; and calculating a packing target value corresponding to each preset layout strategy in the preset layout strategy set according to the at least one of the compactness value, the conical degree value, and the stability value.

8. The method according to claim 1, wherein after the determining the current to-be-packed object and the corresponding transport state thereof, and before the generating the packing sequence of the to-be-packed objects in the to-be-packed object set, the method further comprises:

determining whether the packing sequence and corresponding transport states of all to-be-packed objects in the to-be-packed object set are all determined;

if the packing sequence and the corresponding transport states of the all to-be-packed objects in the to-be-packed object set are not all determined, jumping to a step of the obtaining the priority diagram of the to-be-packed object set in the initial container.

9. The method according to claim 1, wherein after the determining the current to-be-packed object and the corresponding transport state thereof, and before the generating the packing sequence of the to-be-packed objects in the to-be-packed object set, the method further comprises:
- removing a determined current to-be-packed object from the to-be-packed object set;
- determining whether the packing sequence and corresponding transport states of all to-be-packed objects in the to-be-packed object set are all determined;
- if the packing sequence and the corresponding transport states of the all to-be-packed objects in the to-be-packed object set are not all determined, updating the priority diagram of the to-be-packed object set and the current height graph of the target container; and
- jumping to a step of the obtaining the priority diagram of the to-be-packed object set in the initial container.

10. The method according to claim 7, wherein a stability judgment of each to-be-packed object comprises:
- finding out all contact points between a lower surface of a to-be-packed object at a current position and edges of a packed object, and a center point of the lower surface of the to-be-packed object through a geometrical analysis;
- connecting adjacent contact points to form an outlined area;
- determining whether the center point is in the outlined area; and
- if the center point is in the outlined area, determining that the to-be-packed object is stable, otherwise, determining that the to-be-packed object is unstable.

11. The method of claim 1, wherein the to-be-packed objects are two-dimensional or three-dimensional.

12. The method according to claim 1, wherein the encoded dependence information of each to-be-packed object in the preset state is represented by 0 or 1, wherein 0 represents that there is no constraint, and 1 represents that there is a constraint.

13. The method according to claim 4, wherein after the determining the current to-be-packed object and the corresponding transport state thereof, and before the generating the packing sequence of the to-be-packed objects in the to-be-packed object set, the method further comprises:
- removing a determined current to-be-packed object from the to-be-packed object set;
- updating the priority diagram of the to-be-packed object set and the current height graph of the target container; and
- jumping to a step of obtaining the priority diagram of the to-be-packed object set in the initial container.

14. The method according to claim 4, wherein after the determining the current to-be-packed object and the corresponding transport state thereof, and before the generating the packing sequence of the to-be-packed objects in the to-be-packed object set, the method further comprises:
- removing a determined current to-be-packed object from the to-be-packed object set;
- determining whether the packing sequence and corresponding transport states of all to-be-packed objects in the to-be-packed object set are all determined;
- if the packing sequence and the corresponding transport states of the all to-be-packed objects in the to-be-packed object set are not all determined, updating the priority diagram of the to-be-packed object set and the current height graph of the target container; and
- jumping to a step of the obtaining the priority diagram of the to-be-packed object set in the initial container.

15. The method according to claim 2, wherein the initial position information is a relative coordinate position of each to-be-packed object in the initial container, and the initial geometry information comprises a width and a height of each to-be-packed object arranged in the initial container.

16. The method according to claim 1, wherein the preset state is a preset transport state of each to-be-packed object, and the preset transport state comprises a translational transport and a rotational transport.

17. The method according to claim 7, wherein:
- the compactness value is defined as a ratio of a total area of all to-be-packed objects to an area of a rectangle determined by a largest height and a width of the target container;
- the conical degree value is defined as a ratio of the total area of all to-be-packed objects to a projected area of all to-be-packed objects projected onto a bottom of the target container; and
- the stability value is defined as a ratio of the number of stable objects to a total number of packed objects.

18. The method according to claim 4, wherein, the determining the current to-be-packed object and the corresponding transport state thereof according to the packing probability value comprises:
- selecting a packing probability value of the maximum value from the packing probability values;
- determining a to-be-packed object and a corresponding preset state thereof corresponding to the packing probability value of the maximum value; and
- determining the to-be-packed object and the corresponding preset state thereof corresponding to the packing probability value of the maximum value to be the current to-be-packed object and the corresponding transport state thereof, respectively.

19. A computer device comprising a memory and a processor, wherein the memory stores computer programs, and the processor, when executing the computer programs, performs:
- obtaining a priority diagram of a to-be-packed object set in an initial container, the priority diagram being configured to describe dependence constraints between to-be-packed objects in the to-be-packed object set;
- encoding the priority diagram to obtain encoded geometry information and encoded dependence information of each to-be-packed object in a preset state;
- performing, by a neural network (NN), a convolution calculation on the encoded geometry information and the encoded dependence information of each to-be-packed object in the to-be-packed object set in the preset state, and a current height graph of a target container, and determining a current to-be-packed object and a corresponding transport state thereof;
- generating a packing sequence of to-be-packed objects in the to-be-packed object set; and
- determining a strategy of a packing process of the to-be-packed object set according to a packing target, the packing sequence of the to-be-packed objects, and the transport state of each to-be-packed object and a preset layout strategy.

20. A non-transitory computer-readable storage medium, on which computer programs are stored, wherein, the computer programs, when being executed by a processor, cause the processor to perform:
- obtaining a priority diagram of a to-be-packed object set in an initial container, the priority diagram being configured to describe dependence constraints between to-be-packed objects in the to-be-packed object set;

encoding the priority diagram to obtain encoded geometry information and encoded dependence information of each to-be-packed object in a preset state;

performing, by a neural network (NN), a convolution calculation on the encoded geometry information and the encoded dependence information of each to-be-packed object in the to-be-packed object set in the preset state, and a current height graph of a target container, and determining a current to-be-packed object and a corresponding transport state thereof;

generating a packing sequence of to-be-packed objects in the to-be-packed object set; and determining a strategy of a packing process of the to-be-packed object set according to a packing target, the packing sequence of the to-be-packed objects, and the transport state of each to-be-packed object and a preset layout strategy.

* * * * *